UNITED STATES PATENT OFFICE.

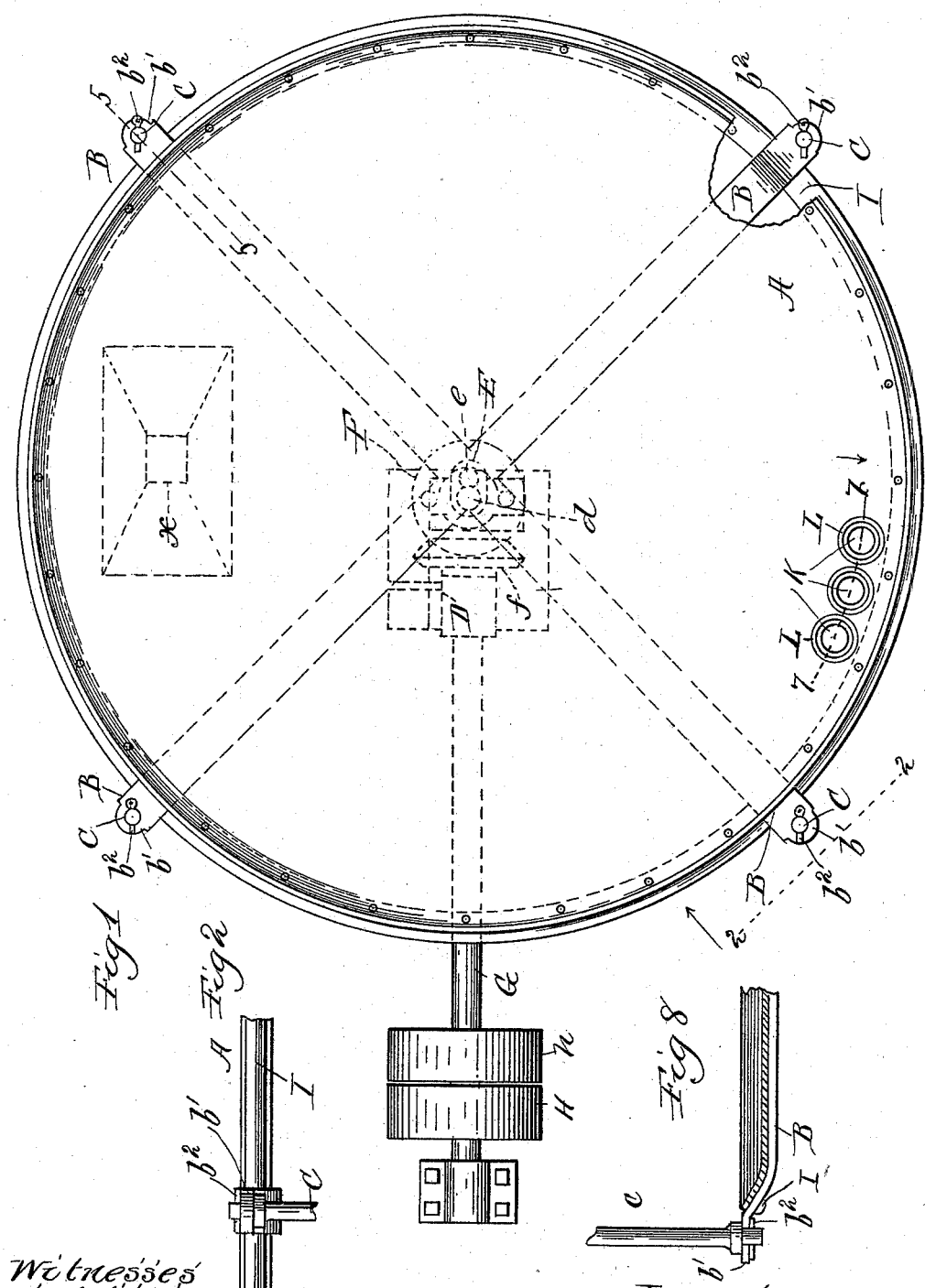

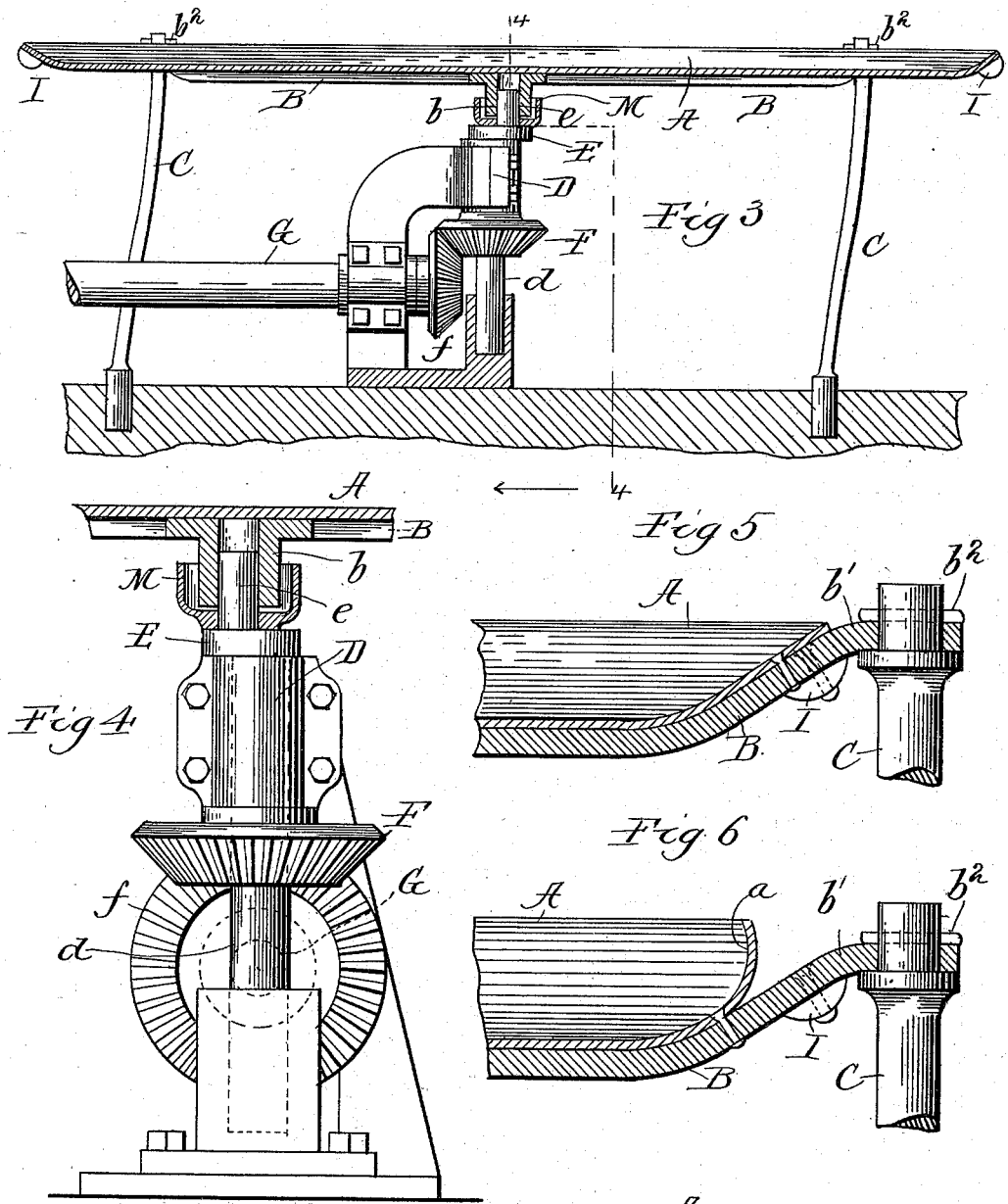

JOSEPH R. MILNER, OF CHICAGO, ILLINOIS.

AMALGAMATOR.

SPECIFICATION forming part of Letters Patent No. 565,628, dated August 11, 1896.

Application filed January 11, 1895. Serial No. 534,540. (No model.)

*To all whom it may concern:*

Be it known that I, JOSEPH R. MILNER, a citizen of the United States, residing at Chicago, in the county of Cook and State of Illinois, have invented certain new and useful Improvements in Amalgamators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to extract from the pulp discharged from a stamp-mill all of the free gold it contains by emptying it into a shallow copper pan treated with mercury and there subjecting it to a peculiar agitation, as hereinafter described, so as to precipitate the gold and insure its contact with the mercury.

The invention consists in a shallow pan made of copper and provided with suitable discharge-openings, the pan being so mounted in connection with a crank-arm that a circular or gyratory motion is communicated to it.

The invention consists of further minor features, as hereinafter specifically pointed out.

In the drawings I show, in Figure 1, a plan view of my improved amalgamator; Fig. 2, a detail of the edge of the pan, taken on the line 2 2 of Fig. 1; Fig. 3, a vertical central section, the operating mechanism being partly in elevation; Fig. 4, an elevation, partly in section, viewed from the line 4 4 of Fig. 3. Fig. 5 is a sectional detail on the line 5 5 of Fig. 1. Fig. 6 is a similar view showing a modified form of the rim. Fig. 7 is a sectional detail on the line 7 7 of Fig. 1; and Fig. 8 is a sectional detail on the line 5 5 of Fig. 1, showing a modified form of support for the pan.

The pan A is formed of a flat circular sheet of copper having its edges slightly upturned to form a low flaring rim, which is preferably concave, as shown at $a$, Fig. 6. This pan is carried by a four-armed spider B, having a central downwardly-projecting hub $b$, apertured or socketed to receive a crank-pin $e$. The arms of the spider B extend a little beyond the edges of the pan A, as indicated at $b'$, their projecting ends being vertically apertured to receive the posts C, upon which the pan is supported. Pins $b^2$ are passed through the upwardly-projecting ends of the posts C to prevent the pan from being accidentally lifted therefrom. The posts C are flexible, so that the pan may be swayed.

The floor-hanger D, within which is journaled a vertical shaft $d$, is mounted below the pan in such position that the shaft is in line with the center of the pan when the posts C are upright. The upper end of the shaft $d$ is provided with a crank-arm E, carrying the crank-pin $e$, which is adapted to engage the socket of the hub $b$. A beveled gear F is mounted upon the shaft $d$ and meshes with a similar gear $f$, carried by a horizontal counter-shaft G, upon which are mounted fast and loose pulleys H $h$, adapted to carry the driving-belt (not shown) leading from any desirable source of power.

Near one side of the pan A its bottom is provided with a number of discharge-apertures, as K, formed by the use of a punch which leaves a downwardly-projecting flange $k$. A copper ring L of a little greater diameter than the holes K encircles each of the latter and is secured to the upper surface of the bottom of the pan by means of short pieces of wire $l$, brazed to the outer surface of the ring and passing through the bottom of the pan, their lower ends being upset so as to form a rivet. As shown, the rings L are formed of wire, the preferred size of which is three-sixteenths of an inch in diameter.

In order to stiffen the edges of the pan and thereby prevent it from being injured by an accidental blow, I prefer to secure to the under surface a band of half-round iron, secured by suitable rivets or bolts.

A cup M, having its bottom centrally apertured, is fitted upon the crank-pin $e$, and incloses the hub $b$ and is intended to hold a quantity of oil for lubricating this bearing, the location of the bearing being such that it is not convenient of access and not conveniently lubricated.

In some situations it may be desirable to support the pan by means of hangers, as $c$, in lieu of the posts C. In mounting the pan so as to engage its hub with the crank-pin e it is necessary to move it to one side, bending its supports. Power being applied to the shafts, it will be seen that the pan is given a circular or gyratory motion without rotation.

In use the pan is adapted to be so placed as to receive the pulp from a stamp-mill upon the side opposite to the openings K, through any suitable chute, as the hopper x. (Indicated in dotted lines in Fig. 1.) The entire inner surface of the pan having been suitably coated with mercury, the machinery is set in motion, the speed of the crank-arm being preferably about one hundred and ten revolutions per minute. The form of the pan and the peculiar motion imparted to it cause its contents to travel slowly and in a serpentine path across to the discharge-apertures, rolling as they travel, insuring the contact of every particle of material with the mercury. By this action the flour-gold, which, in great measure, resists all efforts at precipitation, becomes amalgamated by being thrown directly into contact with the mercury as the material is rolled over. The rings k serve to maintain the pulp at a depth equal to their thickness and prevent the setting in of a current across the pan, whereby the pulp would be too readily discharged.

The holes K are located above any suitable sluiceway, by which the residuum of the mill may be carried away. The downwardly-projecting flanges k prevent the moisture from creeping back along the under surface of the pan.

By the use of this machine I am able to dispense entirely with the copper plates ordinarily placed within the mortars of stamp-mills. The pulp is carried over the extensive mercury-coated copper surface so gently and slowly that practically all of the gold is extracted from it, while no loss whatever of mercury is occasioned by its mechanical displacement by means of abrasion, as is a common experience in amalgamators now in use. The loss of mercury by flouring is also prevented, even though mercury is supplied to the mortars of the stamp-mill, as the movement of the pulp over the surface of the pan results in a gathering of the floured mercury.

In actual practice the application of the amalgamator herein described to a stamp-mill of the ordinary construction, so as to receive from it the pulp which it was the practice to discharge into the gulch, has resulted in the collection of gold from this heretofore abandoned residuum amounting to a very large percentage of the entire product of the mine.

It has heretofore been found difficult to save the exceedingly fine particles of gold commonly known as "floured" gold. By the use of the amalgamator herein shown all of the gold is precipitated, no matter how fine it may be, and I therefore claim for my machine that it will save all of the free gold in the pulp delivered to it.

While I have referred to the device as intended for use in connection with gold-mining, it is obvious that it will be equally efficient in connection with the mining of any mineral in which the amalgamating process is employed.

I claim as my invention—

1. In an amalgamator, the combination with a flat-bottomed circular pan having a flaring rim, overflow discharge-openings for the tailings leading from the pan near its rim and upon one side of a diametrical line, and means for imparting gyratory oscillation to the pan in horizontal plane, substantially as described and for the purpose set forth.

2. In an amalgamator, the combination with a flat-bottomed circular pan having a concave rim, overflow discharge-openings for the tailings leading from the pan near its rim and upon one side of a diametrical line, and means for imparting gyratory oscillation to the pan in horizontal plane, substantially as described and for the purpose set forth.

3. In an amalgamator, the combination with a flat-bottomed circular pan having a flaring rim and whose inner surface has an affinity for mercury, overflow discharge-openings for the tailings leading from the pan near its rim and upon one side of a diametrical line, and means for imparting gyratory oscillation to the pan in horizontal plane, substantially as described and for the purpose set forth.

4. In an amalgamator, the combination with a flat-bottomed circular pan having a flaring rim, overflow discharge-openings for the tailings leading from the pan near its rim and upon one side of a diametrical line, a vertical crank-shaft below the pan, pivotal connection between the crank of the shaft and the bottom of the pan, and flexible supports for the pan, substantially as described and for the purpose set forth.

5. In an amalgamator, the combination with a flat-bottomed circular pan having a concave rim, overflow discharge-openings for the tailings leading from the pan near its rim and upon one side of a diametrical line, a vertical crank-shaft below the pan, pivotal connection between the crank of the shaft and the bottom of the pan, and flexible supports for the pan, substantially as described and for the purpose set forth.

6. In an amalgamator, the combination with a copper pan having discharge-openings in its bottom near one of its sides and wire rings secured to its upper surface so as to inclose such openings, of a spider for carrying the pan, flexible supports for the spider, a hub at the center of the spider, a vertical crank-shaft journaled below the pan and having its crank-pin in engagement with the hub, and means for driving the shaft, substantially as described and for the purpose set forth.

7. In an amalgamator, the combination with a copper pan having discharge-openings in its bottom near one of its sides and overflow walls secured to its upper surface so as to inclose such openings, of a spider for carrying the pan, flexible supports for the spider, a hub at the center of the spider, a vertical crank-shaft journaled below the pan and having its crank-pin in engagement with the hub, and means for driving the shaft, substantially as described and for the purpose set forth.

In testimony whereof I affix my signature in presence of two witnesses.

JOSEPH R. MILNER.

Witnesses:
E. E. BARTHOLOMEW,
SPENCER WARD.